United States Patent
He et al.

(10) Patent No.: US 11,295,104 B2
(45) Date of Patent: Apr. 5, 2022

(54) METHODS AND APPARATUS TO READ BARCODES ON REFLECTIVE SURFACES

(71) Applicant: ZEBRA TECHNOLOGIES CORPORATION, Lincolnshire, IL (US)

(72) Inventors: Duanfeng He, South Setauket, NY (US); Eugene B. Joseph, Coram, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/898,184

(22) Filed: Jun. 10, 2020

(65) Prior Publication Data

US 2021/0390277 A1 Dec. 16, 2021

(51) Int. Cl.
*G06K 7/00* (2006.01)
*G06K 7/10* (2006.01)
*G06K 7/14* (2006.01)

(52) U.S. Cl.
CPC ......... *G06K 7/1465* (2013.01); *G06K 7/1469* (2013.01); *G06K 2007/10524* (2013.01)

(58) Field of Classification Search
CPC ............... G06K 7/1465; G06K 7/1469; G06K 2007/10524
USPC ............................... 235/435, 462.25, 462.29
See application file for complete search history.

(56) References Cited

U.S. PATENT DOCUMENTS

| | | | |
|---|---|---|---|
| 5,461,239 A | 10/1995 | Atherton | |
| 5,751,412 A | 5/1998 | Duell et al. | |
| 5,786,585 A | 7/1998 | Eastman et al. | |
| 6,352,204 B2 | 3/2002 | Hattersley et al. | |
| 6,714,665 B1 | 3/2004 | Hanna et al. | |
| 6,749,120 B2 | 6/2004 | Hung et al. | |
| 6,803,088 B2 | 10/2004 | Kaminsky et al. | |
| 6,854,650 B2 | 2/2005 | Hattersley et al. | |
| 6,915,955 B2 | 7/2005 | Jung et al. | |
| 7,364,081 B2 | 4/2008 | Havens et al. | |
| 7,424,976 B2 | 9/2008 | Muramatsu | |
| 7,448,753 B1 | 11/2008 | Chinnock | |
| 7,475,821 B2 * | 1/2009 | Barkan | G06K 7/10722 235/454 |
| 7,708,205 B2 | 5/2010 | Kotlarsky et al. | |
| 7,717,343 B2 | 5/2010 | Havens et al. | |
| 7,743,991 B2 | 6/2010 | Romanchik | |
| 7,918,397 B2 | 4/2011 | Hussey | |
| 8,038,054 B2 | 10/2011 | Douma | |
| 8,328,099 B2 | 12/2012 | Thuries et al. | |
| 8,366,003 B2 | 2/2013 | Mohan et al. | |

(Continued)

*Primary Examiner* — Tuyen K Vo (74) *Attorney, Agent, or Firm* — Yuri Astvatsaturov (57) ABSTRACT

Example methods and apparatus to read barcodes on reflective surfaces are disclosed herein. An example method for handling a reflective surface in an imaging reader includes capturing one or more images of a surface of an item; detecting whether a specular reflection is present in the one or more images; when a specular reflection is detected, processing one or more additional images of the surface using a predetermined pattern of first processing suitable to identify a barcode on a reflective surface and second processing suitable to identify a barcode on a non-reflective surface; and when a specular reflection is not detected, processing one or more additional images of the surface using the second processing suitable to identify a barcode on a non-reflective surface.

21 Claims, 5 Drawing Sheets

(56) References Cited

U.S. PATENT DOCUMENTS

| | | |
|---|---|---|
| 8,387,881 B2 | 3/2013 | Van Volkinburg et al. |
| 8,389,945 B1 | 3/2013 | Vinogradov et al. |
| 8,457,480 B1 | 6/2013 | Surma et al. |
| 8,628,203 B2 | 1/2014 | Kukita |
| 8,800,873 B2 | 8/2014 | Tanaka et al. |
| 8,820,644 B2 | 9/2014 | Ferren et al. |
| 8,847,150 B2 | 9/2014 | Handshaw et al. |
| 8,857,719 B2 | 10/2014 | Liu et al. |
| 8,870,073 B2 | 10/2014 | Detwiler |
| 9,058,531 B2 | 6/2015 | Slutsky |
| 9,122,939 B2 | 9/2015 | Gao et al. |
| 9,235,741 B2 | 1/2016 | Hennick et al. |
| 9,501,678 B2 | 11/2016 | Lu et al. |
| 9,514,344 B2 | 12/2016 | Gao et al. |
| 9,594,936 B1* | 3/2017 | Gao .................. G06K 7/10732 |
| 9,646,189 B2 | 5/2017 | Lu et al. |
| 9,659,199 B2 | 5/2017 | Van Volkinburg et al. |
| 9,677,942 B2 | 6/2017 | Steenhoek |
| 9,697,405 B2 | 7/2017 | Bremer |
| 9,734,590 B2 | 8/2017 | Prakash |
| 9,934,454 B2 | 4/2018 | Kirkerud et al. |
| 9,996,720 B2 | 6/2018 | Wang et al. |
| 10,055,626 B2 | 8/2018 | Beghtol et al. |
| 10,055,627 B2 | 8/2018 | Feng et al. |
| 10,078,827 B2 | 9/2018 | Li et al. |
| 10,121,039 B2 | 11/2018 | Todeschini et al. |
| 10,176,474 B2 | 1/2019 | Wong |
| 10,210,365 B2 | 2/2019 | Meier et al. |
| 10,216,969 B2 | 2/2019 | Feng et al. |
| 10,339,431 B2 | 7/2019 | Yoshida |
| 10,339,664 B2 | 7/2019 | Rhoads |
| 10,360,424 B2 | 7/2019 | Feng et al. |
| 10,372,954 B2 | 8/2019 | Todeschini |
| 10,417,468 B2 | 9/2019 | Slowik et al. |
| 10,430,776 B2 | 10/2019 | Svetal |
| 10,474,858 B2 | 11/2019 | Davis et al. |
| 10,503,945 B2 | 12/2019 | Lei et al. |
| 2004/0008244 A1* | 1/2004 | Tsujimoto .............. B41J 11/009 347/105 |
| 2006/0283952 A1* | 12/2006 | Wang .................. G06K 7/1417 235/462.01 |
| 2012/0105672 A1* | 5/2012 | Doepke ................ H04N 5/2351 348/229.1 |
| 2015/0281667 A1* | 10/2015 | Hata ..................... H04N 9/735 348/223.1 |
| 2015/0310601 A1 | 10/2015 | Rodriguez et al. |
| 2018/0314863 A1 | 11/2018 | Gao et al. |
| 2019/0122087 A1 | 4/2019 | Thuries et al. |
| 2019/0154439 A1 | 5/2019 | Binder |
| 2019/0171855 A1* | 6/2019 | Suman .................. G02B 26/12 |
| 2019/0269385 A1 | 9/2019 | Ebbini et al. |
| 2019/0272696 A1 | 9/2019 | Van Horn et al. |

* cited by examiner

METHODS AND APPARATUS TO READ BARCODES ON REFLECTIVE SURFACES

FIELD OF THE DISCLOSURE

The present disclosure relates generally to imaging readers, and, more particularly, to methods and apparatus to detect reflective surfaces and read barcodes on reflective surfaces.

BACKGROUND

Solid-state imaging readers (e.g., barcode readers) have long been used, in both handheld and hands-free modes of operation, in many industries, such as machine vision, retail, manufacturing, warehousing, distribution, postal, transportation, logistics, etc., to electro-optically read targets, such as one- or two-dimensional barcode symbols to be decoded. An imaging reader generally includes an imaging system having a solid-state imager with a sensor array of photocells or light sensors, and an optical assembly for directing return illumination light scattered and/or reflected from the target being imaged onto the imager to capture of an image of the target. The imager produces electrical signals representative of an image that are decoded and/or processed by a programmed microprocessor or controller into information related to the target being read, e.g., decoded data identifying the target. The controller is operative for transmitting the decoded data, either via a wireless or wired link, to a remote host for further processing, e.g., price retrieval from a price database to obtain a price for the identified target.

Reading barcodes on reflective surfaces (e.g., the screens of mobile devices, tablet, laptops, computers, televisions, etc.) may be a challenge. For example, a barcode displayed on the screen of a mobile device is often noisy due to the number of pixels used to display the barcode on the screen. Further, barcodes on mobile devices tend to be darker, compared to printed barcodes, because the mobile device's screen does not scatter light as paper does.

SUMMARY

When reflective surfaces may be present, some example solutions use a pre-determined pattern to designate some image frames (i.e., images) for processing under the assumption that a reflective surface (e.g., one that creates a specular reflection) is present, and processing other images for processing under the assumption that a non-reflective surface (e.g., a dispersive surface such as paper, a matte screen, etc.) is present. In some examples, images assuming a reflective surface are processed differently (e.g., averaged) than for non-reflective surfaces, and may be partially done in a hardware unit such as an application specific integrated circuit (ASIC) or field-programmable gate array (FPGA). These images for processing assuming a reflective surface are taken at intervals from the sequence of images from the imager. The rate at which are these images are processed assuming a reflective surface versus a non-reflective surface may affect barcode reading performance. While processing more images assuming a reflective surface improves the performance of barcode reading for reflective surfaces, it may decrease the barcode decoding performance for non-reflective surfaces. Thus, a goal of the present disclosure is to detect whether or not a reflective surface is actually present (e.g., with some degree of certainty) and to process assuming a reflective surface when a reflective surface is detected, thereby decreasing the contention between processing images assuming a non-reflective surface is present versus processing images assuming a reflective surface is present.

For ease of discussion, image frames (i.e., images) that are being processed assuming a reflective surface is present (e.g., using processing suitable for identifying and decoding barcodes on reflective surfaces), whether or not a reflective surface is actually present, are referred to herein as reflective images. Accordingly, a reflective image may or may not be an image of an actual reflective surface, but is being referred to herein as a reflective image because it is being processed under the assumption that the image is of a reflective surface. Similarly, for ease of discussion, images that are being processed assuming a non-reflective surface is present (e.g., using processing suitable for identifying and decoding barcodes on non-reflective surfaces), whether or not a non-reflective surface is actually present, are referred to herein as non-reflective images. Accordingly, a non-reflective image may or may not be an image of an actual non-reflective surface, but is being referred to herein as a non-reflective image because it is being processed under the assumption that the image is of a non-reflective surface.

In an embodiment, an example method for handling a reflective surface in an imaging reader includes capturing one or more images of a surface of an item; detecting whether a specular reflection is present in the one or more images; when a specular reflection is detected, processing one or more additional images of the surface using a predetermined pattern of first processing suitable to identify a barcode on a reflective surface and second processing suitable to identify a barcode on a non-reflective surface; and when a specular reflection is not detected, processing one or more additional images of the surface using the second processing suitable to identify a barcode on a non-reflective surface.

In another embodiment, an apparatus includes an imaging device configured to capture one or more images of a surface of an item; a processing device; and a non-transitory tangible computer-readable storage medium storing computer-readable instructions. The instructions, when executed by the processing device, cause the apparatus to: detect whether a specular reflection is present in the one or more images; when a specular reflection is detected, process one or more additional images of the surface using a predetermined pattern of first processing suitable to identify a barcode on a reflective surface and second processing suitable to identify a barcode on a non-reflective surface; and when a specular reflection is not detected, process one or more additional images of the surface using the second processing suitable to identify a barcode on a non-reflective surface.

In still another embodiment, an imaging reader includes: an imaging device configured to capture one or more images of a surface of an item; a computing device configured to detect when a specular reflection is present in the one or more images, and determine the surface is reflective when a specular reflection is detected; and a barcode reader configured to: when a specular reflection is detected, process one or more additional images of the surface using a predetermined pattern of first processing suitable to identify a barcode on a reflective surface and second processing suitable to identify a barcode on a non-reflective surface; and when a specular reflection is not detected, process one or more additional images of the surface using the second processing suitable to identify a barcode on a non-reflective surface.

In yet another embodiment, a non-transitory tangible computer-readable storage medium stores computer-readable instructions that, when executed by a processing device, cause an imaging reader to: detecting whether a specular reflection is present in one or more images; determining the surface is reflective when a specular reflection is detected; when a specular reflection is detected, process one or more additional images of the surface using a predetermined pattern of first processing suitable to identify a barcode on a reflective surface and second processing suitable to identify a barcode on a non-reflective surface; and when a specular reflection is not detected, process one or more additional images of the surface using the second processing suitable to identify a barcode on a non-reflective surface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed are example methods and apparatus to detect reflective surfaces and read barcodes on reflective surfaces that overcome at least some of the above deficiencies of conventional imaging readers. In some instances, an imaging reader (e.g., a barcode reader) illuminates an item being imaged. When the item has a reflective surface (e.g., a screen of a mobile device), images of the item may include a reflection of the illumination back toward the barcode reader as, for example, a specular reflection. As will be discussed below in detail, a specular reflection can be detected by determining a histogram of brightnesses of an image, and identifying a high-brightness blip (e.g., short, crisp, sharp move up and down, relatively smaller, etc.) that is distinguishable from (e.g., separated by a gap in the histogram) the low-brightness content (e.g., the barcode) of the rest of the image. That is, by detecting a gap between a first range of brightnesses associated with specular reflections and a second range of brightnesses associated with content (e.g., the barcode).

When a high-brightness blip is not detected, images of the item are processed as non-reflective images. When a high-brightness blip is detected, images of the item are processed as a pattern of reflective images and non-reflective images. For example, every nth image is processed as a reflective image. Thereby, contention between processing images as non-reflective images vs. reflective images can be reduced, thus, improving the performance of barcode reading for non-reflective surface, as compared to conventional approaches. For instances, when a reflective surface is detected, processing can change promptly to processing images as reflective images. Likewise, once barcodes, indicia, symbols or the like have been decoded for reflective images, processing can promptly revert to processing images as non-reflective images. Accordingly, responsiveness to changes between reflective and non-reflective surfaces can be increased.

Reference will now be made in detail to non-limiting examples, some of which are illustrated in the accompanying drawings.

Figure 1:
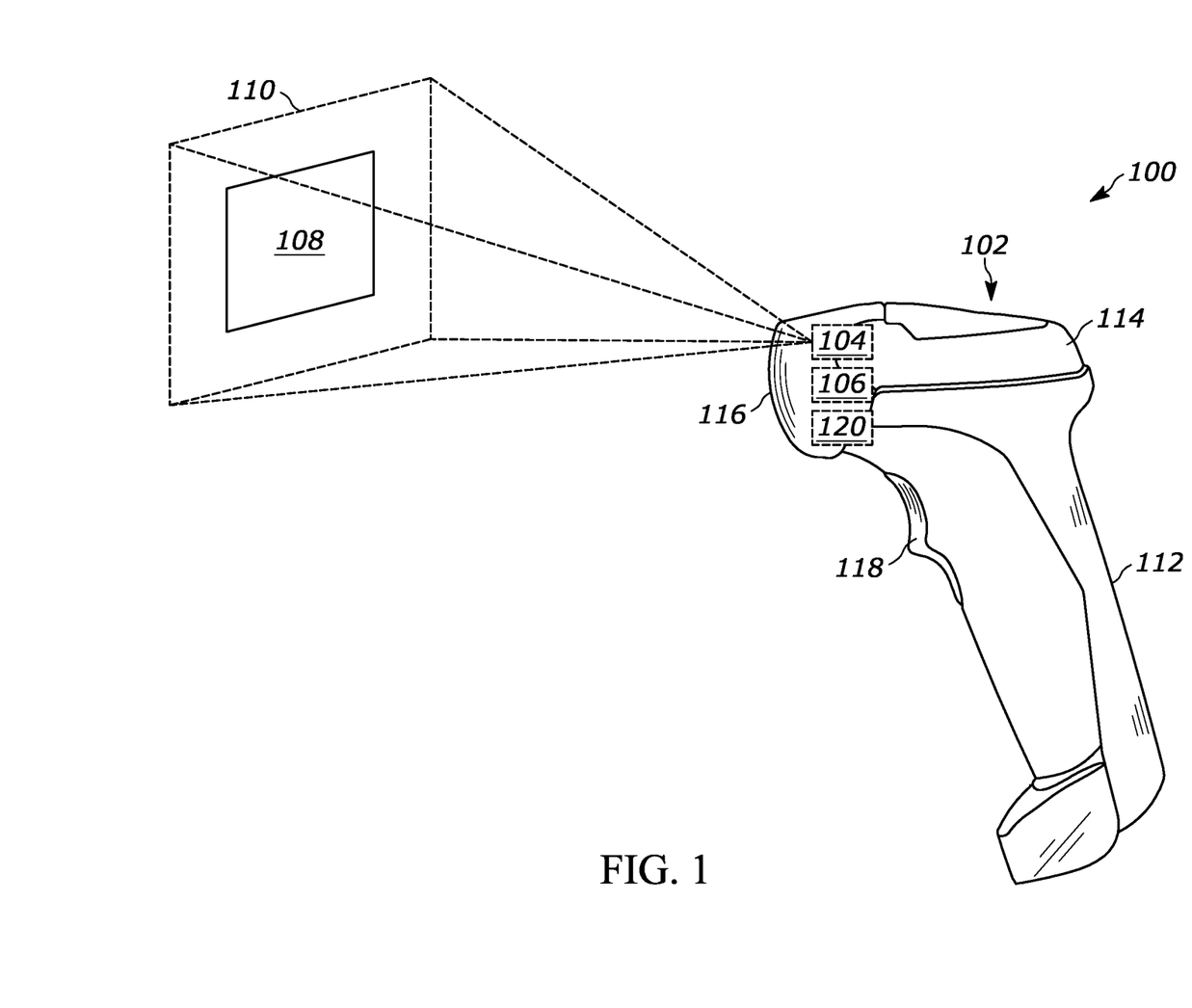
FIG. 1 illustrates a perspective view of an example embodiment of an example barcode reader for reading barcodes on reflective surfaces, in accordance with this disclosure.

FIG. 1 illustrates an example handheld imaging reader in the form of a barcode reader 100 configured to, among possibly other things, electro-optically read targets, such as barcodes, symbols, indicia or the like. The barcode reader 100 includes an example housing 102 in which an imaging module 104 and example computing components 106 in accordance with aspects of this disclosure are mounted. The imaging module 104 captures images of an item 108 in an imaging field-of-view (FOV) 110. While not shown for clarity of illustration, the barcode reader 100 may project one or more lines, symbols, etc. to depict, represent, approximate, indicate, etc. the metes and bounds of the imaging FOV 110 to a user.

The housing 102 includes an example generally elongated handle or lower handgrip portion 112, and a barrel or upper body portion or top 114 having a front end at which a light-transmissive window 116 is located. The cross-sectional dimensions and overall size of the handle 112 are such that the barcode reader 100 can conveniently be held in an operator's hand. The body and handle portions 112, 114 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of this barcode reader 100. A manually actuatable trigger 118 is mounted in a moving relationship on the handle 112 in a forward facing region of the barcode reader 100. An operator's finger can be used to actuate the trigger 118 to read the target by depressing the trigger 118 once the target(s) fall within the imaging FOV 110. Although the housing 102 is illustrated as a portable, point-of-transaction, gun-shaped, handheld housing, any other configuration including a hands-free configuration could be used. In some examples, the housing 102 is configured for at least temporary use in a base, dock, etc. for stationary use. Further, the housing 102 may have the shape of a semi-stationary device intended for stationary use.

Further still, the housing 102 may be included in a fixed stationary device such as a bioptic scanner installed in a point-of-sale (POS) station.

The computing components 106 may include any number and/or type(s) wired and/or wireless communication interface(s) 120 that communicatively couple the barcode reader 100 to any of a base, a dock, a POS station, a server, a computing system, etc. The communication interface(s) 120 may be configured to operate in accordance with any suitable interface(s), protocol(s), signal(s), connector(s), etc. like, for example, a TCP/IP interface, a Wi-Fi™ interface (according to the IEEE 802.11 family of standards), an Ethernet transceiver, a universal serial bus (USB) interface, a Bluetooth® interface, a near field communication (NFC) interface, and/or an infrared transceiver, or any other suitable communication protocols or standards.

In some examples, the computing components 106 convey data representing images to any of a base, a dock, a POS system, a server, a computing system, etc. via the communication interface(s) 120. Additionally and/or alternatively, the computing components 106 decode barcodes, symbols, indicia, etc. present in the images, and convey the barcodes, symbols, indicia, etc. to any of a base, a dock, a POS system, a server, a computing system, etc. via the communication interface(s) 120. The images, barcodes, symbols, indicia may be conveyed to a base, a dock, a POS system, a server, a computing system, etc. as collected and/or in a batch fashion.

While an example barcode reader 100 is illustrated in FIG. 1, one or more of the aspects illustrated in FIG. 1 may be combined, divided, re-arranged, omitted, eliminated and/or implemented in any other way. Further, the barcode reader 100 may include one or more aspects in addition to, or instead of, those illustrated in FIG. 1, and/or may include more than one of any or all of the illustrated aspects.

Figure 2:
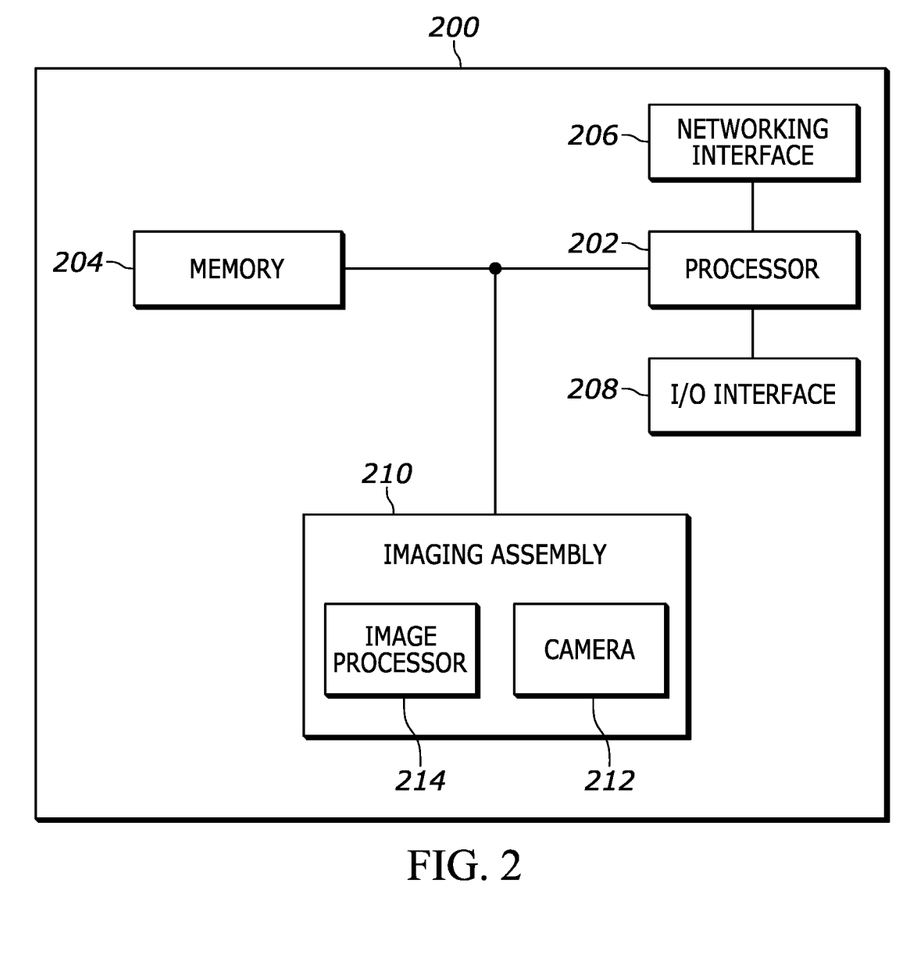
FIG. 2 is a block diagram of an example logic circuit for implementing the barcode reader of FIG. 1 and/or, more generally, the example methods and/or operations described herein.

FIG. 2 is a block diagram representative of an example logic circuit capable of implementing, for example, one or more components of the example imaging module 104 and/or the example computing components 106 of FIG. 1 or, more generally, the example barcode reader 100 of FIG. 1. The example logic circuit of FIG. 2 is a processing platform 200 (e.g., a computing device) capable of executing instructions to, for example, implement operations of the example apparatus and methods described herein. Additional and/or alternative example logic circuits capable of, for example, implementing operations of the example apparatus and methods disclosed herein include FPGAs and ASICs.

The example processing platform 200 of FIG. 2 includes a processor 202 such as, for example, one or more microprocessors, controllers, and/or any suitable type of processor. The example processing platform 200 of FIG. 2 includes any number or types of non-transitory computer- or machine-readable memory (e.g., volatile memory, non-volatile memory, etc.) 204 and/or storage devices accessible by the processor 202 (e.g., via a memory controller) in which information may be stored for any duration (e.g., permanently, for an extended time period, for a brief instance, for temporarily buffering, for caching of the information, etc.). The example processor 202 interacts with the memory 204 to obtain, for example, computer- or machine-readable instructions stored in the memory 204 corresponding to, for example, the operations disclosed herein. Additionally or alternatively, computer- or machine-readable instructions corresponding to the example operations described herein may be stored on one or more removable media (e.g., an optical storage drive, a compact disc (CD), a digital versatile disk (DVD), a removable flash memory, etc.) that may be coupled to the processing platform 200 to provide access to the computer- or machine-readable instructions stored thereon.

The example processing platform 200 of FIG. 2 also includes one or more network interface(s), one of which is designated at reference numeral 206, to enable communication with other machines (e.g., a base, a dock, a POS system, a server, a computing system, etc.) via, for example, one or more networks. The example network interface(s) 206 includes any suitable type of communication interface(s) (e.g., wired and/or wireless interfaces) configured to operate in accordance with any suitable protocol(s) like, for example, a TCP/IP interface, a Wi-Fi™ transceiver (according to the IEEE 202.11 family of standards), an Ethernet transceiver, a cellular network radio, a satellite network radio, a cable modem, a digital subscriber line (DSL) modem, a dialup modem, or any other suitable communication protocols or standards.

The example processing platform 200 of FIG. 2 also includes input/output (I/O) interfaces such as the trigger 118, one of which is designated at reference numeral 208, to enable receipt of user input, communicate output data to the user, and/or communicate with other devices (e.g., a base, a dock, a POS system, a server, a computing system, etc.). The I/O interface(s) 208 may include any number and/or type(s) of different types of I/O circuits or components that enable the processor 202 to communicate with peripheral I/O devices. Example I/O interfaces 208 include a universal serial bus (USB), a Bluetooth® interface, a near field communication (NFC) interface, and/or an infrared transceiver. The peripheral I/O devices may be any desired type of I/O device such as a keyboard, a display, a navigation device (e.g., a mouse, a trackball, a capacitive touch pad, a joystick, etc.), a speaker, a microphone, a printer, a button, etc.

To capture images of the imaging FOV 110, the example processing platform 200 includes an imaging assembly 210 having any number and/or type(s) of cameras 212 and, in some examples, an image processor 214. The camera 212 under control of, for example, the processor 202 and/or the image processor 214 captures images of the portion of environment in which the processing platform 200 is operating that falls within the imaging FOV 110. The image processor 214 implements a barcode reader to detect and/or decode barcodes, symbols, indicia, etc. present in reflective images and non-reflective images. For use in detecting specular reflections, the image processor 214 may compute and/or perform operations on histograms. The image processor 214 may be implemented by the processor 202, an ASIC, an FPGA, etc. In some examples, the processor 202 implements a barcode reader to detect and/or decode barcodes, symbols, indicia, etc. present in images.

Aspects of the processing platform 200 may, in some examples, be implemented separately. For example, the imaging assembly 216 may be implemented in the handheld imaging barcode reader 100 which is in communication with a dock, a base, a POS system, a computing system, a server, etc. that is separate from the barcode reader 100 via the I/O interface(s) 208 and/or the network interface(s) 206.

Figure 3:
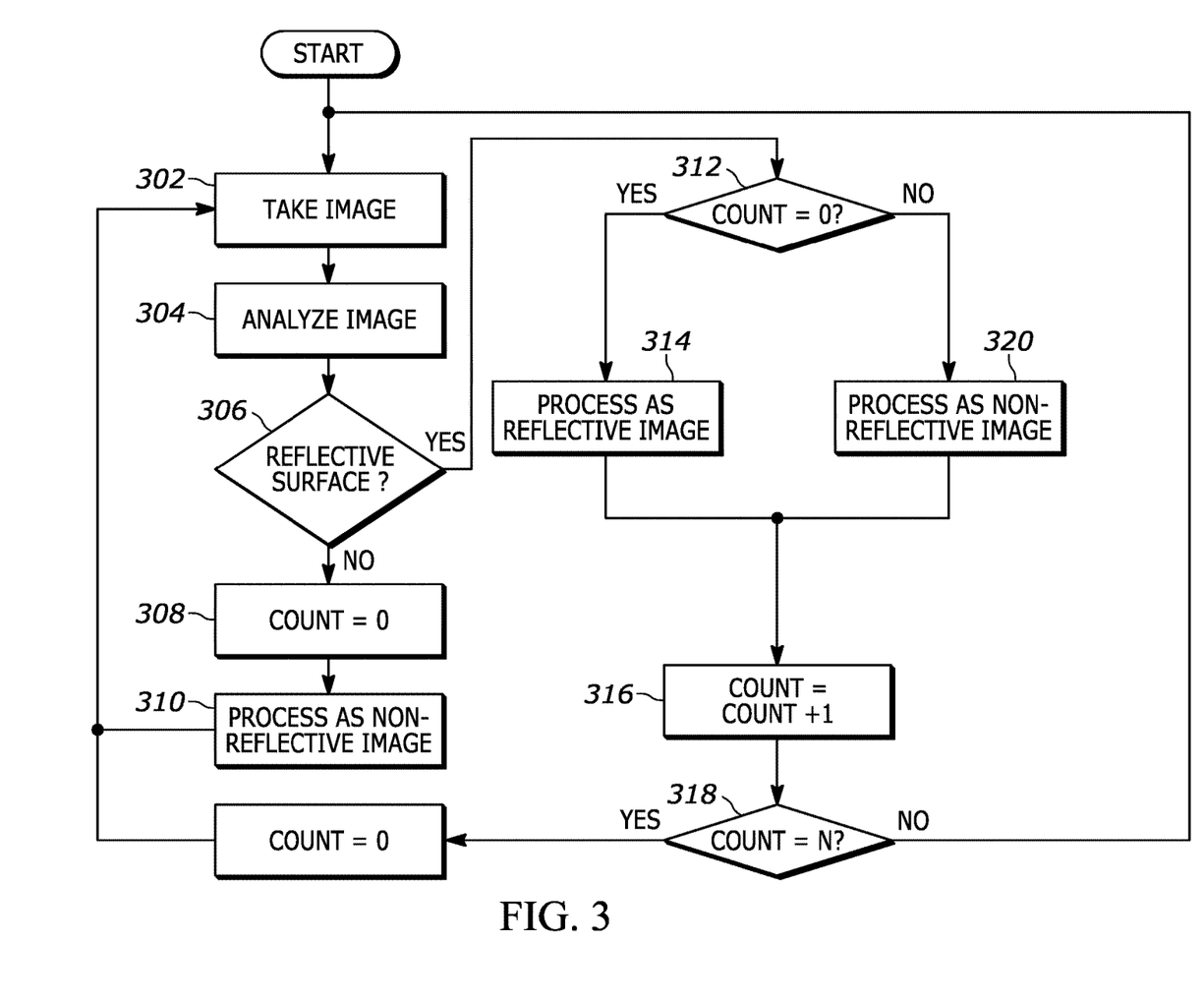
FIG. 3 is a flowchart representative of example methods, logic or machine-readable instructions for implementing the example barcode reader of FIG. 1 and/or, more generally, the example methods and/or operations described herein.
Figure 4:
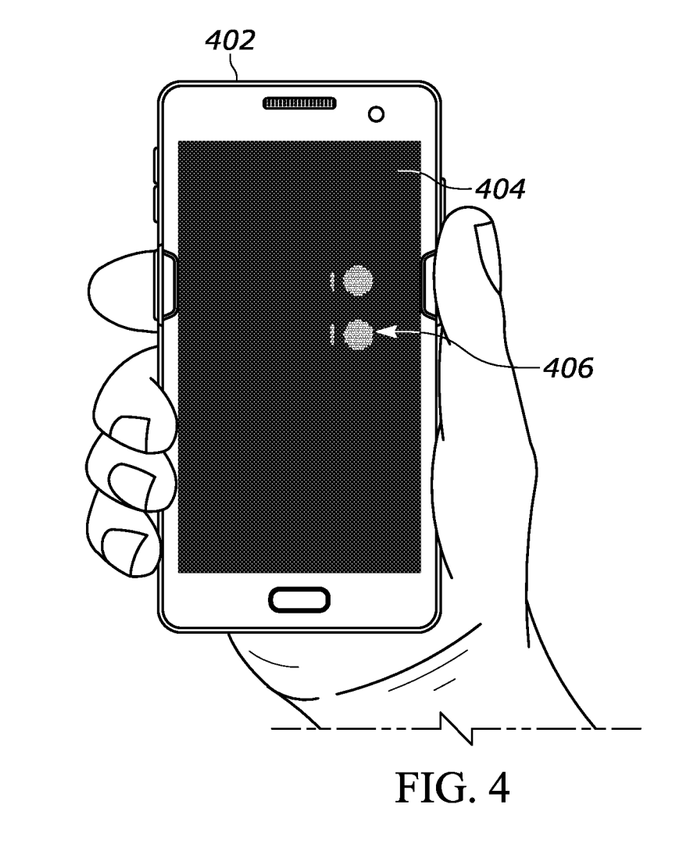
FIG. 4 is an example image of a reflective surface showing a specular reflection.

Example operations of the example processing platform 200 will now be described in connection with a flowchart shown in FIG. 3. A flowchart 300 representative of example processes, methods, logic, software, computer- or machine-readable instructions for implementing the barcode reader 100 of FIG. 1 and/or, more generally, the example methods and/or operations described herein is shown in FIG. 3. The program of FIG. 3 begins at block 302 when an image is taken. As shown in FIG. 4, when the item 402 has a reflective surface 404 (e.g., a screen of a mobile device), images of the item 404 may include a reflection 406 of illumination, ambient light, etc. back toward a barcode reader as, for example, a specular reflection. The image captured at block 302 is processed at block 304 to detect a reflective surface by detecting the presence of such specular reflections. At block 304, the image processor 214 and/or the processor 202 computes a histogram 500 (see FIG. 5) of brightnesses of the image. In some examples, the histograms of multiple images are combined (e.g., added together, averaged, etc.) to, for example, reduce noise. In some examples, binned histograms (e.g., histograms with several adjacent entries added together) are used, and/or histograms of subsampled images are used. The following also may be used when not all of a reflective surface is imaged, as long as the specular reflection is imaged.

Figure 5:
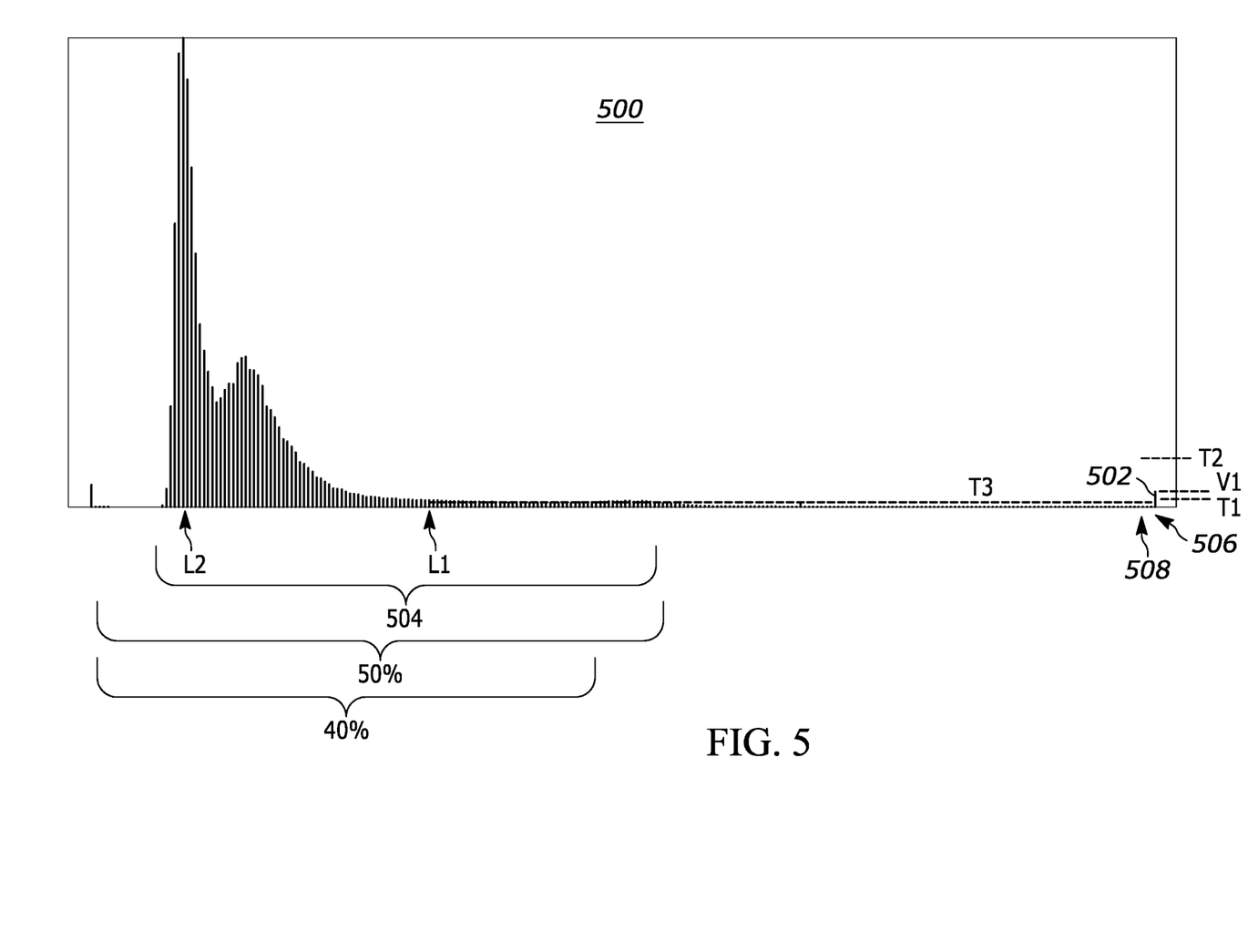
FIG. 5 is an example histogram of brightnesses of an image taken of a reflective surface experiencing a specular reflection.

The specular reflection can be detected by determining the histogram 500, and identifying that a high-brightness blip 502 is found that is distinguishable from the low-brightness content 504 (e.g., the object containing the barcode) of the rest of the image. As shown, the specular reflection blip 502 and the low-brightness content 504 are well separated in brightness. For example, there is a gap or separation in the histogram between the high-brightness blip 502 and the low-brightness content 504. Having made this discovery, the histogram 500 can be processed to detect specular reflections. If the value V1 of the rightmost entry 506 (e.g., last entry, highest-brightness entry) of the histogram 500 satisfies one or more criteria, for example, the value V1 is between two thresholds (e.g., exceeds a low predetermined threshold T1 and does not exceed a high predetermined threshold T2), a variable threshold T3 is set to for example, 0.25*V1. For example, the low predetermined threshold T1 is selected to be less than the high predetermined threshold T2, and both are selected to be less than the number of pixels in the image. Starting with the entry 508 immediately to the left of the rightmost entry 506 of the histogram 500 and moving leftward (e.g., from higher frequencies to lower frequencies) through the histogram 500, the location L1 of the first identified entry of the histogram 500 whose value exceeds the variable threshold T3 is identified. If the location L1, and a location L2 of the largest entry of the histogram 500 satisfy respective thresholds, then a reflective surface is determined to have been detected. For example, if the location L1 is in the lower 50% of the histogram, and the location L2 is in the lower 40% of the histogram, then a reflective surface is determined to have been detected.

If a reflective surface is not detected (e.g., a specular reflection is not detected) (block 306), a variable COUNT is reset to zero (block 308), and the image is considered a non-reflective image and processed assuming a non-reflective surface (block 310), and control returns to block 302 to capture a next image. That is, the image is processed using first processing suitable for identifying and decoding barcodes on non-reflective surfaces.

Returning to block 306, if a reflective surface is detected (e.g., a specular reflection is detected) (block 306), and COUNT equals zero (block 312), then the image is processed assuming a reflective surface (block 314). That is, the image is processed using second processing suitable for identifying and decoding barcodes on reflective surfaces. The value of COUNT is incremented by one (block 316). If COUNT satisfies a threshold (e.g., is equal to N, which is the total number of images processed versus those processed as reflective images) (block 318), control returns to block 302 to capture a next image.

Returning to block 312, if COUNT does not equal zero (block 312), then the image is processed assuming a non-reflective surface (block 320), and control proceeds to block 316. That is, the image is processed using the first processing suitable for identifying and decoding barcodes on non-reflective surfaces.

Alternative implementations of the example represented by the block diagram of FIG. 2 includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more ASICs, one or more FPGAs, one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and/or represented by the flowcharts of this disclosure, if such are present). Some example logic circuits include a combination of specifically configured hardware and hardware that executes machine-readable instructions. The above description refers to various operations described herein and/or flowcharts that may be appended hereto to illustrate the flow of those operations. Any such descriptions and/or flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

Example methods and apparatus to provide radial aiming patterns are disclosed herein. Further examples and combinations thereof include at least the following:

Example 1 is a method for handling a reflective surface in an imaging reader, the method comprising:
  capturing one or more images of a surface of an item;
  detecting whether a specular reflection is present in the one or more images;
  when a specular reflection is detected, processing one or more additional images of the surface using a predetermined pattern of first processing suitable to identify a barcode on a reflective surface and second processing suitable to identify a barcode on a non-reflective surface; and
  when a specular reflection is not detected, processing one or more additional images of the surface using the second processing suitable to identify a barcode on a non-reflective surface.

Example 2 is the method of example 1, wherein the predetermined pattern includes processing an image with the first processing followed by processing a plurality of images with the second processing.

Example 3 is the method of example 1 or example 2, wherein detecting the specular reflection includes:
  computing a first histogram of brightnesses of the one or more images; and
  identifying a gap in the first histogram between a first range of brightnesses associated with barcodes and a second range of brightnesses associated the specular reflection.

Example 4 is the method of example 3, wherein computing the first histogram includes:
  computing a plurality of histograms for respective ones of the one or more images; and
  combining the plurality of histograms to form the first histogram.

Example 5 is the method of example 3, wherein computing the first histogram includes:
  computing a second histogram of one or more of the images; and
  combining adjacent brightnesses of the second histogram to form the first histogram.

Example 6 is the method of example 1 or example 2, wherein detecting the specular reflection includes:
  computing a first histogram of brightnesses of the one or more images;
  identifying a first location of the largest value in a brightness range of the first histogram associated with specular reflections, the largest value corresponding to a first location in the histogram; and
  when a first value of the first entry satisfies a first predetermined threshold:
    identifying a second entry of the histogram closest to the first entry in brightness having a second value that exceeds a second threshold that is based on the first value,
    identifying a third entry of the histogram having a third value that is a maximum value of the histogram, and
    detecting the specular reflection when a second brightness associated the second entry is less than a third predetermined threshold, and a third brightness associated with the third entry is less than a fourth predetermined threshold.

Example 7 is the method of example 6, wherein, when the first value satisfies the first determined threshold and satisfies a fifth predetermined threshold: identifying the second entry, identifying the third entry, and detecting the specular reflection.

Example 8 is the method of any of examples 1 to 7, wherein the specular reflection is detected when the surface of the item includes a screen of at least one of a mobile phone, a tablet, a laptop, or a computer.

Example 9 is the method of any of examples 1 to 8, further comprising reverting to the second processing when at least one of a barcode is decoded, or a specular reflection is no longer detected.

Example 10 is an apparatus comprising:
  an imaging device configured to capture one or more images of a surface of an item;
  a processing device; and
  a non-transitory tangible computer-readable storage medium storing computer-readable instructions that, when executed by the processing device, cause the apparatus to:
    detect whether a specular reflection is present in the one or more images;
    when a specular reflection is detected, process one or more additional images of the surface using a predetermined pattern of first processing suitable to identify a barcode on a reflective surface and second processing suitable to identify a barcode on a non-reflective surface; and
    when a specular reflection is not detected, process one or more additional images of the surface using the second processing suitable to identify a barcode on a non-reflective surface.

Example 11 is the apparatus of example 10, wherein the computer-readable instructions, when executed by a processing device, cause the apparatus to detect the specular reflection by:
  computing a histogram of brightnesses of the one or more images; and
  identifying a gap in the histogram between a first range of brightnesses associated with barcodes and a second range of brightnesses associated the specular reflection.

Example 12 is the apparatus of example 10, wherein the computer-readable instructions, when executed by a processing device, cause the apparatus to detect the specular reflection by:
  computing a histogram of brightnesses of the one or more images;
  identifying a first location of the largest value in a brightness range of the histogram associated with specular reflections, the largest value corresponding to a first location in the histogram; and
  when a first value of the first entry satisfies a first predetermined threshold:
    identifying a second entry of the histogram closest to the first entry in brightness having a second value that exceeds a second threshold that is based on the first value,
    identifying a third entry of the histogram having a third value that is a maximum value of the histogram, and
    detecting the specular reflection when a second brightness associated the second entry is less than a third predetermined threshold, and a third brightness associated with the third entry is less than a fourth predetermined threshold.

Example 13 is an imaging reader comprising:
  an imaging device configured to capture one or more images of a surface of an item;
  a computing device configured to detect when a specular reflection is present in the one or more images, and determine the surface is reflective when a specular reflection is detected; and
  a barcode reader configured to:
    when a specular reflection is detected, process one or more additional images of the surface using a predetermined pattern of first processing suitable to identify a barcode on a reflective surface and second processing suitable to identify a barcode on a non-reflective surface; and when a specular reflection is not detected, process one or more additional images of the surface using the second processing suitable to identify a barcode on a non-reflective surface.

Example 14 is the imaging reader of example 13, wherein the computing device is to detect the specular reflection by:

computing a first histogram of brightnesses of the one or more images; and identifying a gap in the first histogram between a first range of brightnesses associated with barcodes and a second range of brightnesses associated the specular reflection.

Example 15 is the imaging reader of example 13, wherein the computing device is to detect the specular reflection by:

computing first histogram of brightnesses of the one or more images;

identifying a first location of the largest value in a brightness range of the first histogram associated with specular reflections, the largest value corresponding to a first location in the histogram; and when a first value of the first entry satisfies a first predetermined threshold:

identifying a second entry of the histogram closest to the first entry in brightness having a second value that exceeds a second threshold that is based on the first value, identifying a third entry of the histogram having a third value that is a maximum value of the histogram, and detecting the specular reflection when a second brightness associated the second entry is less than a third predetermined threshold, and a third brightness associated with the third entry is less than a fourth predetermined threshold.

Example 16 is the imaging reader of any of examples 13 to 15, wherein the computing device is at least one of an application specific integrated circuit (ASIC), a field-programmable gate array (FPGA), or a programmable processor.

Example 17 is the imaging reader of any of examples 13 to 16, further comprising a trigger configured to initiate capture of the one or more images of the surface of the item when activated by a user.

Example 18 is a non-transitory tangible computer-readable storage medium storing computer-readable instructions that, when executed by a processing device, cause an imaging reader to:

detecting whether a specular reflection is present in one or more images;

determining the surface is reflective when a specular reflection is detected;

when a specular reflection is detected, process one or more additional images of the surface using a predetermined pattern of first processing suitable to identify a barcode on a reflective surface and second processing suitable to identify a barcode on a non-reflective surface; and when a specular reflection is not detected, process one or more additional images of the surface using the second processing suitable to identify a barcode on a non-reflective surface.

Example 19 is the non-transitory tangible computer-readable storage medium of example 21, wherein the predetermined pattern includes processing an image with the first processing followed by processing a plurality of images with the second processing.

Example 20 is the non-transitory tangible computer-readable storage medium of example 18 or example 19, wherein the computer-readable instructions, when executed by a processing device, cause the imaging reader to detect the specular reflection by:

computing a histogram of brightnesses of the one or more images; and identifying a gap in the histogram between a first range of brightnesses associated with barcodes and a second range of brightnesses associated the specular reflection.

Example 21 is the non-transitory tangible computer-readable storage medium of example 18 or example 19, wherein the computer-readable instructions, when executed by a processing device, cause the imaging reader to detect the specular reflection by:

computing a histogram of brightnesses of the one or more images;

identifying a first location of the largest value in a brightness range of the histogram associated with specular reflections, the largest value corresponding to a first location in the histogram; and when a first value of the first entry satisfies a first predetermined threshold:

identifying a second entry of the histogram closest to the first entry in brightness having a second value that exceeds a second threshold that is based on the first value, identifying a third entry of the histogram having a third value that is a maximum value of the histogram, and detecting the specular reflection when a second brightness associated the second entry is less than a third predetermined threshold, and a third brightness associated with the third entry is less than a fourth predetermined threshold.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A or B" is intended to refer to implementations including any of (1) at least one A, (2) at least one B, and (3) at least one A and at least one B. Similarly, the phrase "at least one of A and B" is intended to refer to implementations including any of (1) at least one A, (2) at least one B, and (3) at least one A and at least one B. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein, the expressions "in communication," "coupled" and "connected," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for handling a reflective surface in an imaging reader, the method comprising:
   capturing one or more images of a surface of an item;
   detecting whether a specular reflection is present in the one or more images;
   when a specular reflection is detected, processing one or more additional images of the surface using a predetermined pattern of first processing suitable to identify a barcode on a reflective surface and second processing suitable to identify a barcode on a non-reflective surface; and
   when a specular reflection is not detected, processing one or more additional images of the surface using the second processing suitable to identify a barcode on a non-reflective surface.

2. The method of claim 1, wherein the predetermined pattern includes processing an image with the first processing followed by processing a plurality of images with the second processing.

3. The method of claim 1, wherein detecting the specular reflection includes:
   computing a first histogram of brightnesses of the one or more images; and
   identifying a gap in the first histogram between a first range of brightnesses associated with barcodes and a second range of brightnesses associated the specular reflection.

4. The method of claim 3, wherein computing the first histogram includes:
   computing a plurality of histograms for respective ones of the one or more images; and
   combining the plurality of histograms to form the first histogram.

5. The method of claim 3, wherein computing the first histogram includes:
   computing a second histogram of one or more of the images; and
   combining adjacent brightnesses of the second histogram to form the first histogram.

6. The method of claim 1, wherein detecting the specular reflection includes:
   computing a histogram of brightnesses of the one or more images;
   identifying a first entry of the histogram having a largest value in a brightness range of the histogram associated with specular reflections; and
   when the largest value satisfies a first predetermined threshold:
      identifying a second entry of the histogram closest to the first entry and having a second value that exceeds a second threshold that is based on the largest value, identifying a third entry of the histogram having a third value that is a maximum value of the histogram, and detecting the specular reflection when a second brightness associated the second entry is less than a third predetermined threshold, and a third brightness associated with the third entry is less than a fourth predetermined threshold.

7. The method of claim 6, wherein, when the largest value satisfies the first determined threshold and satisfies a fifth predetermined threshold:

identifying the second entry, identifying the third entry, and detecting the specular reflection.

8. The method of claim 1, wherein the specular reflection is detected when the surface of the item includes a screen of at least one of a mobile phone, a tablet, a laptop, or a computer.

9. The method of claim 1, further comprising reverting to the second processing when at least one of a barcode is decoded, or a specular reflection is no longer detected.

10. An apparatus comprising:
an imaging device configured to capture one or more images of a surface of an item;
a processing device; and
a non-transitory tangible computer-readable storage medium storing computer-readable instructions that, when executed by the processing device, cause the apparatus to:
detect whether a specular reflection is present in the one or more images;
when a specular reflection is detected, process one or more additional images of the surface using a predetermined pattern of first processing suitable to identify a barcode on a reflective surface and second processing suitable to identify a barcode on a non-reflective surface; and
when a specular reflection is not detected, process one or more additional images of the surface using the second processing suitable to identify a barcode on a non-reflective surface.

11. The apparatus of claim 10, wherein the computer-readable instructions, when executed by a processing device, cause the apparatus to detect the specular reflection by:
computing a histogram of brightnesses of the one or more images; and
identifying a gap in the histogram between a first range of brightnesses associated with barcodes and a second range of brightnesses associated the specular reflection.

12. The apparatus of claim 10, wherein the computer-readable instructions, when executed by a processing device, cause the apparatus to detect the specular reflection by:
computing a histogram of brightnesses of the one or more images;
identifying a first entry of the histogram having a largest value in a brightness range of the histogram associated with specular reflections; and
when the largest value satisfies a first predetermined threshold:
identifying a second entry of the histogram closest to the first entry and having a second value that exceeds a second threshold that is based on the largest value,
identifying a third entry of the histogram having a third value that is a maximum value of the histogram, and
detecting the specular reflection when a second brightness associated the second entry is less than a third predetermined threshold, and a third brightness associated with the third entry is less than a fourth predetermined threshold.

13. An imaging reader comprising:
an imaging device configured to capture one or more images of a surface of an item;
a computing device configured to detect when a specular reflection is present in the one or more images, and determine the surface is reflective when a specular reflection is detected; and
a barcode reader configured to:
when a specular reflection is detected, process one or more additional images of the surface using a predetermined pattern of first processing suitable to identify a barcode on a reflective surface and second processing suitable to identify a barcode on a non-reflective surface; and
when a specular reflection is not detected, process one or more additional images of the surface using the second processing suitable to identify a barcode on a non-reflective surface.

14. The imaging reader of claim 13, wherein the computing device is to detect the specular reflection by:
computing a first histogram of brightnesses of the one or more images; and
identifying a gap in the first histogram between a first range of brightnesses associated with barcodes and a second range of brightnesses associated the specular reflection.

15. The imaging reader of claim 13, wherein the computing device is to detect the specular reflection by:
computing a histogram of brightnesses of the one or more images;
identifying a first entry of the histogram having a largest value in a brightness range of the histogram associated with specular reflections; and
when the largest value satisfies a first predetermined threshold:
identifying a second entry of the histogram closest to the first entry and having a second value that exceeds a second threshold that is based on the largest value,
identifying a third entry of the histogram having a third value that is a maximum value of the histogram, and
detecting the specular reflection when a second brightness associated the second entry is less than a third predetermined threshold, and a third brightness associated with the third entry is less than a fourth predetermined threshold.

16. The imaging reader of claim 13, wherein the computing device is at least one of an application specific integrated circuit (ASIC), a field-programmable gate array (FPGA), or a programmable processor.

17. The imaging reader of claim 13, further comprising a trigger configured to initiate capture of the one or more images of the surface of the item when activated by a user.

18. A non-transitory tangible computer-readable storage medium storing computer-readable instructions that, when executed by a processing device, cause an imaging reader to:
detecting whether a specular reflection is present in one or more images of a surface of an item;
determining the surface is reflective when a specular reflection is detected;
when a specular reflection is detected, process one or more additional images of the surface using a predetermined pattern of first processing suitable to identify a barcode on a reflective surface and second processing suitable to identify a barcode on a non-reflective surface; and when a specular reflection is not detected, process one or more additional images of the surface using the second processing suitable to identify a barcode on a non-reflective surface.

19. The non-transitory tangible computer-readable storage medium of claim 18, wherein the predetermined pattern includes processing an image with the first processing followed by processing a plurality of images with the second processing.

20. The non-transitory tangible computer-readable storage medium of claim 18, wherein the computer-readable instructions, when executed by a processing device, cause the imaging reader to detect the specular reflection by:
computing a histogram of brightnesses of the one or more images; and
identifying a gap in the histogram between a first range of brightnesses associated with barcodes and a second range of brightnesses associated the specular reflection.

21. The non-transitory tangible computer-readable storage medium of claim 18, wherein the computer-readable instructions, when executed by a processing device, cause the imaging reader to detect the specular reflection by:
computing a histogram of brightnesses of the one or more images;
identifying a first entry of the histogram having a largest value in a brightness range of the histogram associated with specular reflections; and
when the largest value satisfies a first predetermined threshold:
identifying a second entry of the histogram closest to the first entry and having a second value that exceeds a second threshold that is based on the largest value,
identifying a third entry of the histogram having a third value that is a maximum value of the histogram, and
detecting the specular reflection when a second brightness associated the second entry is less than a third predetermined threshold, and a third brightness associated with the third entry is less than a fourth predetermined threshold.

* * * * *